United States Patent
Dutta et al.

(10) Patent No.: US 8,176,465 B2
(45) Date of Patent: May 8, 2012

(54) PLUGGABLE MODEL ELEMENTS

(75) Inventors: Suhail Dutta, Kirkland, WA (US); Bill Gibson, Seattle, WA (US); Patrick Cooney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1389 days.

(21) Appl. No.: 11/711,355

(22) Filed: Feb. 27, 2007

(65) Prior Publication Data

US 2008/0209390 A1    Aug. 28, 2008

(51) Int. Cl.
*G06F 9/44* (2006.01)

(52) U.S. Cl. ........ 717/104; 717/106; 717/107; 717/108; 717/110

(58) Field of Classification Search .................. None
See application file for complete search history.

(56) References Cited

U.S. PATENT DOCUMENTS 6,502,213 B1 * 12/2002 Bowman-Amuah ............ 714/49

* cited by examiner

*Primary Examiner* — Chuck Kendall
(74) *Attorney, Agent, or Firm* — Chin IP, PLLC; David Chin

(57) ABSTRACT

Various technologies and techniques are disclosed for providing pluggable model elements. A modeling application is provided that is operable to allow custom model elements to be loaded. Custom behavior can be associated with the custom model element types in a modular fashion that allows custom behaviors to be plugged in. The modeling application interacts with an artifact mapper to automatically synchronize a particular model in the modeling application with an underlying one or more artifacts represented by the particular model. Events are intercepted between model elements and underlying artifacts that the model elements represent. As events are intercepted, one or more appropriate provider plug-ins are called to perform one or more associated actions. A user who toggles between a modeling application and an artifact source application is provided with a seamless viewing experience because the model elements and underlying artifacts are kept up to date with each other.

20 Claims, 20 Drawing Sheets

PLUGGABLE MODEL ELEMENTS

BACKGROUND

In modern software development, models may be created as a way to define or describe a piece of a solution or a complete solution. These models can then be visualized using a modeling tool. For example, a computer software component diagram may reflect the system architecture and represent the structure of the system including such things as source code. Traditionally, models are static, that is, they represent a point-in-time snapshot of the systems and underlying artifacts that they represent.

Artifacts are physical manifestations of computer software, such as code files, configuration files, entire projects, etc. When these underlying artifacts change, the model must be updated, typically by hand, to reflect those changes. More recently, modeling tools have incorporated some level of automated synchronization with the artifacts that they seek to represent. The level of automation is often limited to the modeling tool performing synchronization activities when the user invokes a command (e.g. presses a button, etc.).

Many modeling tools are also limited in that they can only synchronize with those types of artifacts that are already known at the time the modeling tool is shipped. This awareness is made known by defining the type of artifacts directly in the modeling tool. Many modeling tools do not allow for the definition of new types of artifacts, let alone how to interact with those artifacts to stay synchronized.

SUMMARY

Various technologies and techniques are disclosed for providing pluggable model elements. A modeling application is provided that is operable to allow custom model elements to be created. Custom behavior can be associated with the custom model elements in a modular fashion that allows custom behaviors to be plugged in. The modeling application interacts with an artifact mapper to automatically synchronize a particular model in the modeling application with an underlying one or more artifacts represented by the particular model. Events are intercepted by an event generator between model elements and underlying artifacts that the model elements represent. As the events are intercepted, the events are forwarded to a provider manager that is responsible for calling one or more appropriate provider plug-ins to perform one or more associated actions. A user who toggles between a modeling application and an artifact source application is provided with a seamless viewing experience because the model elements and the underlying artifacts are kept up to date with each other.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
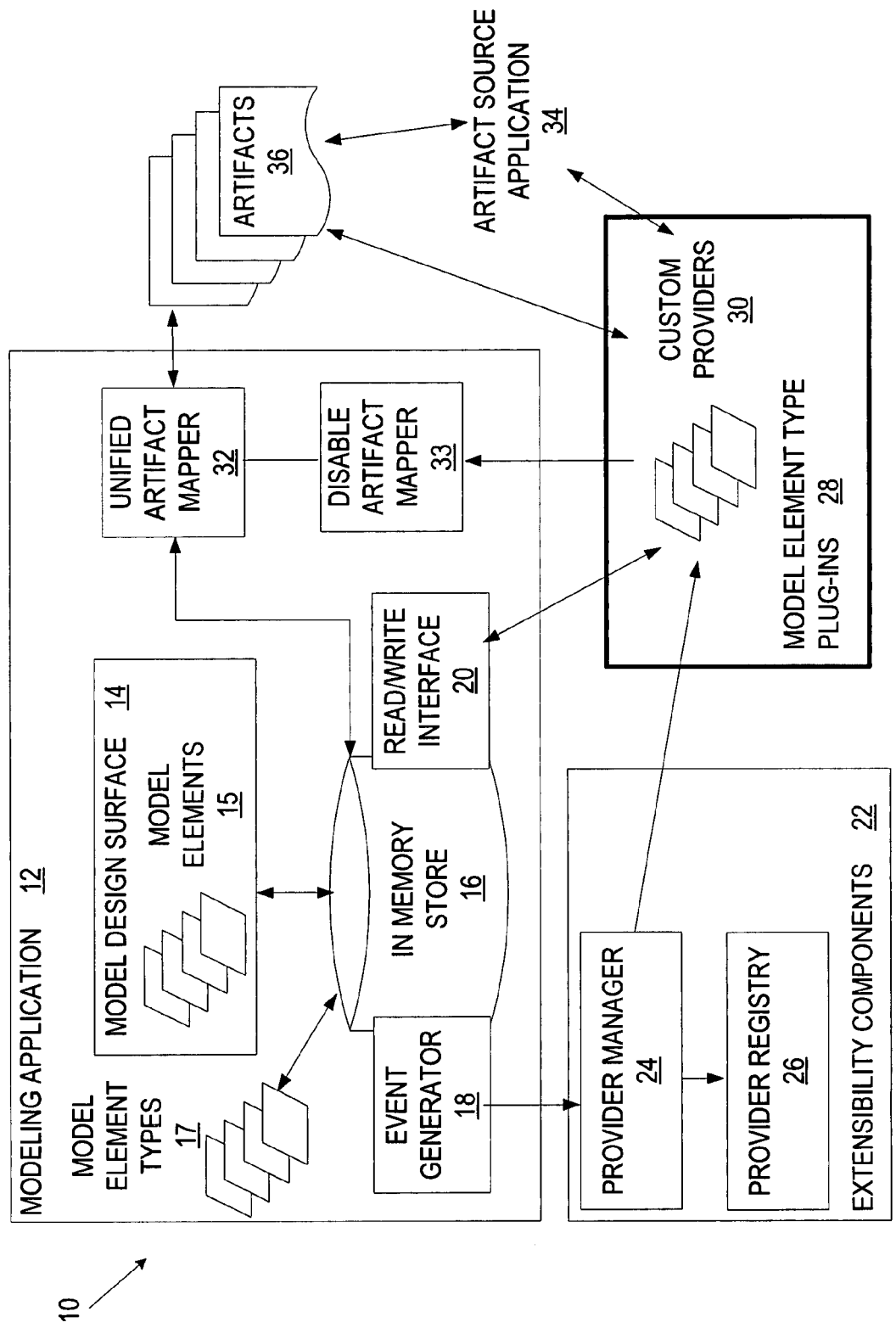
FIG. 1 is a diagrammatic view of a pluggable model element system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides interaction between modeling tools that represent system artifacts and tools that create the actual underlying artifacts, but the system also serves other purposes in addition to these. In one implementation, one or more of the techniques described herein can be implemented as features within a software development program such as MICROSOFT® VISUAL STUDIO®, or from any other type of program or service that allows for the creation of model elements and/or artifacts.

In one implementation, the system provides an infrastructure for creating pluggable model elements. Using the pluggable model elements, the user can add new model elements with custom behavior, and/or customize an existing model element (e.g. one that came with the product or otherwise) with new behavior. Furthermore, an infrastructure is provided for keeping the model elements synchronized with the underlying artifacts that those model elements represent. The term "artifact" as used herein is meant to include a concrete entity that is created during the software development process and can be used during the lifetime of the software (e.g. throughout development and/or after deployment, management, etc.). Artifacts that are generated during a typical software development process may include, but not limited to, programming logic, design documentation, testing documentation, project plans, and computing environments. The term "model element" as used herein is meant to include anything that can be represented in a model that is a representation of an artifact elsewhere. Model elements can also include conceptual ideas such as people, ideas, and/or processes that are not represented in an artifact elsewhere. For example, the system can be used to keep a system model that represents the bigger picture view of the system (e.g. as shown with model elements) in synch with the actual reality of the code elements and other implementation details (e.g. the underlying artifacts).

As shown in FIG. 1, an exemplary system 10 is shown for modeling and synchronizing artifacts. In one implementation, system 10 includes modeling application 12, extensibility components 22, model element plug-ins 28, unified artifact mapper 32, disable artifact mapper 33, artifact source application 34, and artifacts 36. The components of system 10 may, themselves, be comprised of other components.

Modeling application 12 contains programming logic to create and manipulate solution models. The solution model is created using model design surface 14 and is composed of model elements 15 that represent model element types 17. At an appropriate point in time, the modeling application receives input to persist the model information and attributes. Model information and attributes are persisted in "in memory store" 16. Modeling application 12 also comprises event generator 18 that causes events to be raised and propagated to other parts of the system. Events can be raised for one of various reasons, such as when a change to the model requires synchronization with the underlying artifacts, when the artifacts have changed, when a custom event action needs to be taken, when the user has been idle for a certain amount of time, etc. Model application 12 also comprises read/write interface 20 that provides entities external to model application 12 programmatic access to models.

System 10, in one implementation, is comprised of extensibility components 22. Extensibility components 22 are comprised of provider manager 24 and provider registry 26. Provider manager 24 is responsible for managing the interaction between modeling application 12 and model element type plug-ins 28. The term "provider manager" as used herein is meant to include event models with publish and subscribe capabilities that cause events to be raised and handled appropriately. Provider registry 26 is responsible for tracking which specific instances of model element type plug-ins 28 have been registered for use with modeling application 12.

System 10, in one implementation, is further comprised of model element type plug-ins 28. Model element type plug-ins 28 is comprised of custom providers 30. Custom provider plug-ins are used to add new model elements and associated behaviors to a modeling application. Custom providers 30 may interact with read/write interface 20, disable artifact mapper 33, and artifacts 36. In one implementation, the custom provider(s) 30 make changes to physical artifacts 36 directly. In another implementation, the custom provider 30 interacts with an artifact source application 34 to have the artifact source application 34 perform changes to artifacts 36. In this latter scenario, two or more tools can be integrated.

System 10, in one implementation, is further comprised of unified artifact mapper 32, disable artifact mapper 33, and artifacts 34. Unified artifact mapper 32 contains programming that allows changes made to model elements 15 and artifacts 34 to be detected. Disable artifact mapper 33 may be optionally used by custom provider plug-ins 30 to disregard actions being issued by unified artifact mapper 32. Artifacts 34 are the underlying representations of model elements 15.

Figure 2:
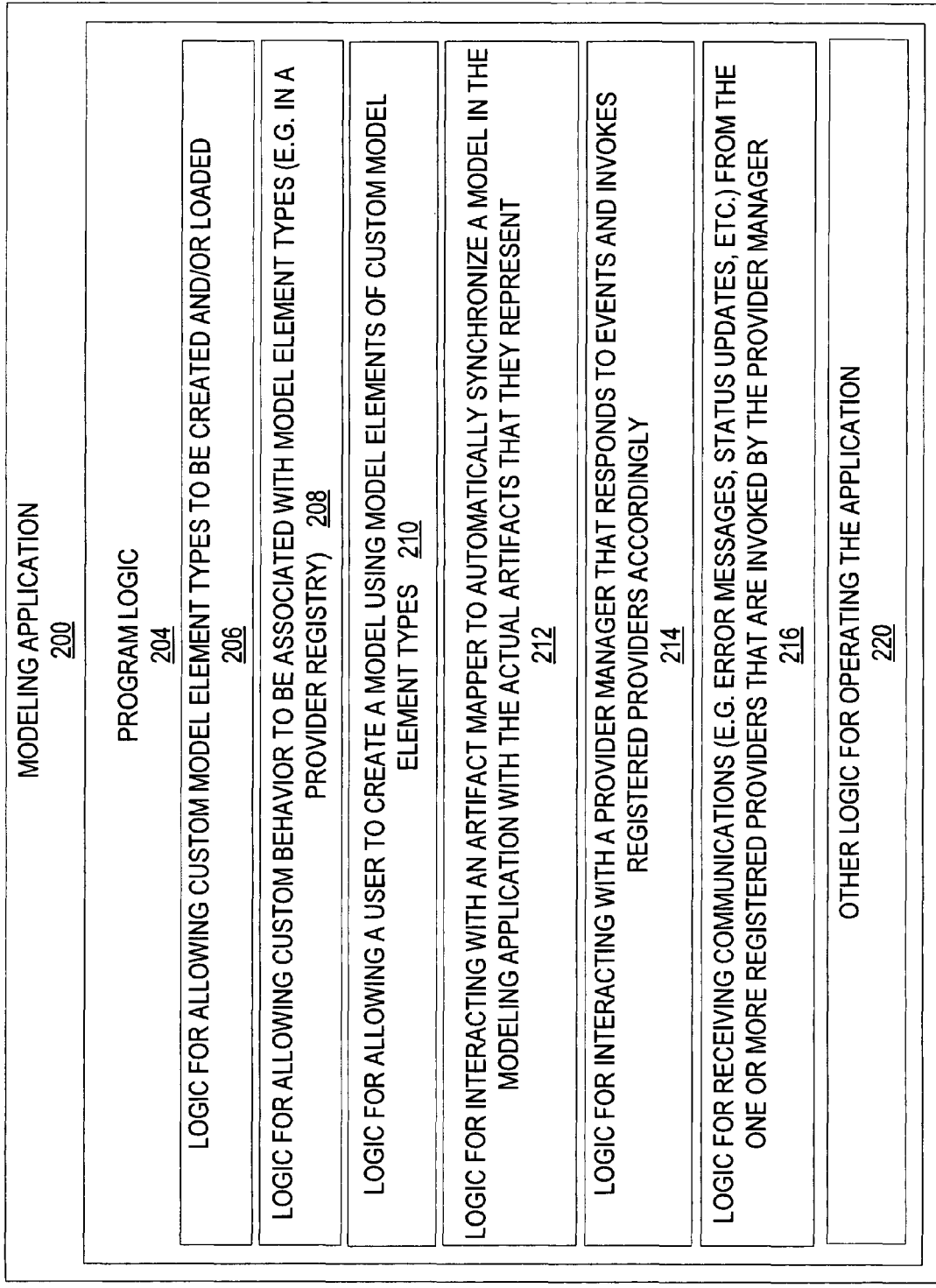
FIG. 2 is a diagrammatic view of a modeling application of one implementation.

Turning now to FIG. 2, a diagrammatic view of a modeling application of one implementation is shown. Modeling application 200 is one of the application programs that reside on computing device 800. However, it will be understood that modeling application 200 can alternatively or additionally be embodied as computer-executable instructions on one or more computers and/or in different variations. Alternatively or additionally, one or more parts of modeling application 200 can be part of system memory 804 (of FIG. 20), on other computers and/or applications 815 (of FIG. 20), or other such variations as would occur to one in the computer software art.

Modeling application 200 includes program logic 204, which is responsible for carrying out some or all of the techniques described herein. Program logic 204 includes logic for allowing custom model element types to be created and/or loaded 206; logic for allowing custom behavior to be associated with model element types 208 (e.g. in a provider registry); logic for allowing a user to create a model using model elements of custom model element types 210; logic for interacting with an artifact mapper to automatically synchronize a model in the modeling application with the actual artifacts that they represent 212; logic for interacting with a provider manager that responds to events and invokes registered providers (e.g. provider plug-ins) accordingly 214; logic for receiving communications (e.g. error messages, status updates, etc.) from one or more registered providers (e.g. provider plug-ins) that are invoked by the provider manager 216; and other logic for operating the application 220. In one implementation, program logic 204 is operable to be called programmatically from another program, such as using a single call to a procedure in program logic 204.

Figure 3:
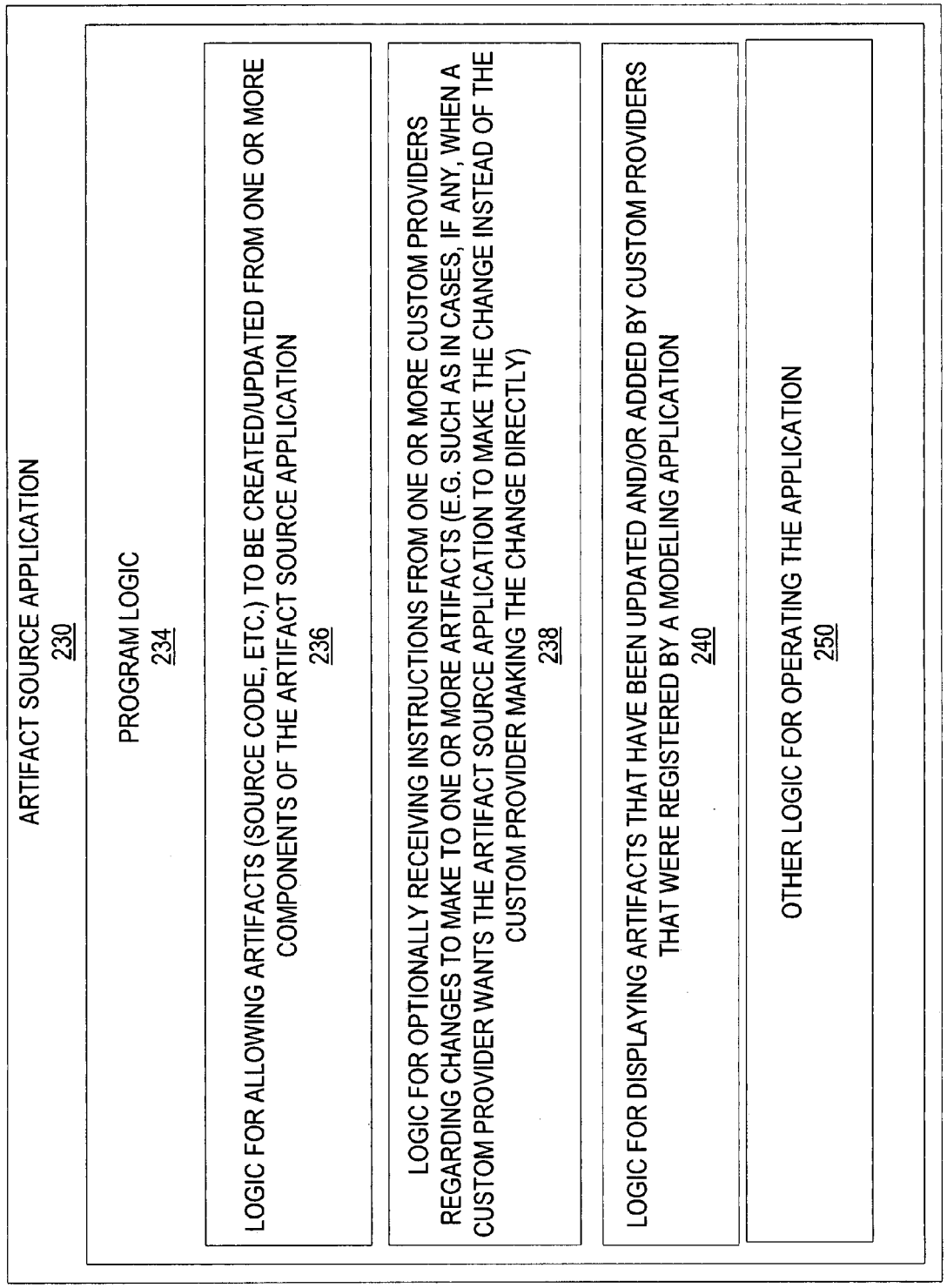
FIG. 3 is a diagrammatic view of an artifact source application of one implementation.
Figure 20:
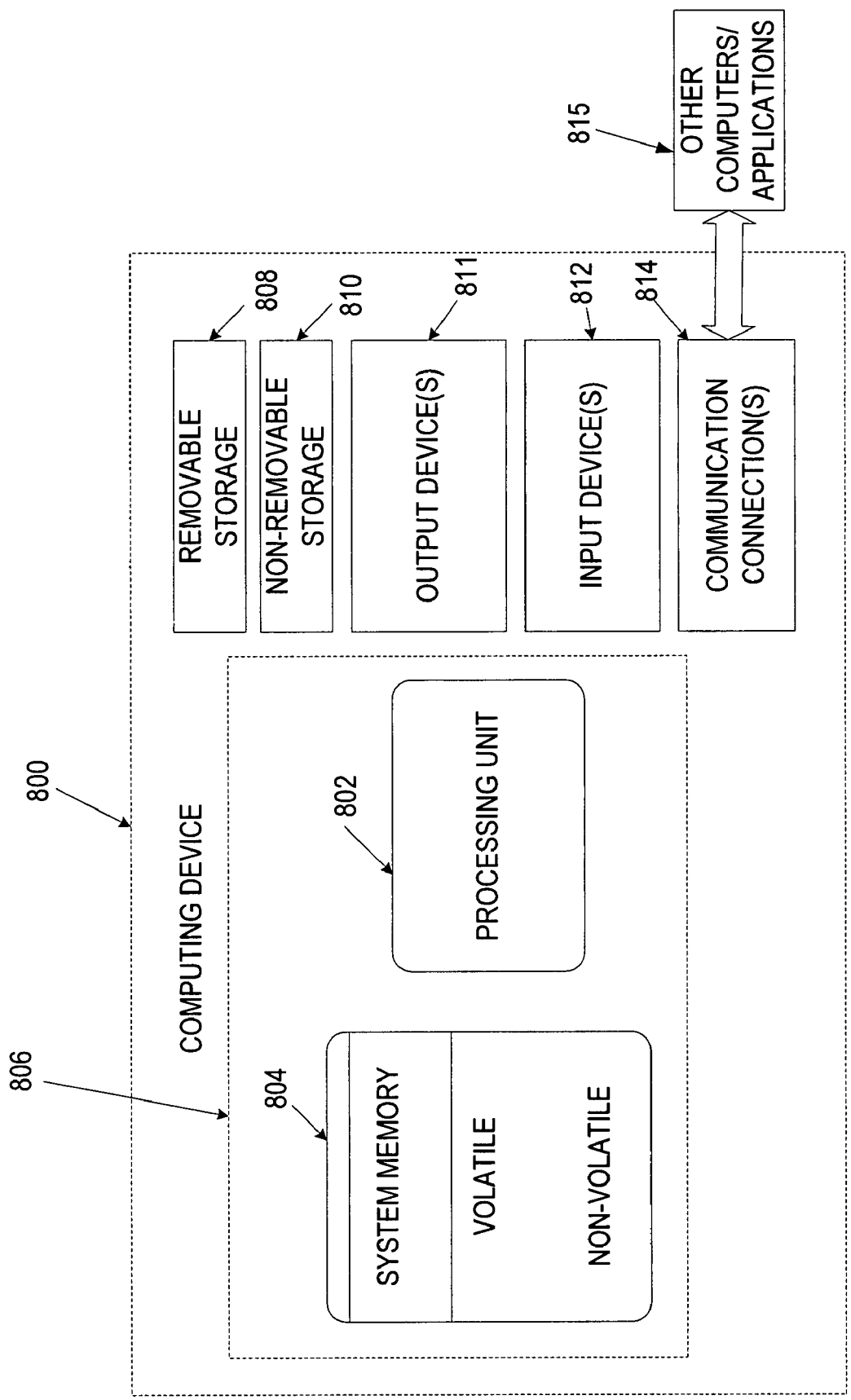
FIG. 20 is a diagrammatic view of a computer system of one implementation that can run one or more parts of the system of FIG. 1.

Turning now to FIG. 3 with reference to FIG. 20, a diagrammatic view of an artifact source application of one implementation. Artifact source application 230 operating on computing device 800 is illustrated. Artifact source application 230 is one of the application programs that reside on computing device 800. However, it will be understood that artifact source application 230 can alternatively or additionally be embodied as computer-executable instructions on one or more computers and/or in different variations. Alternatively or additionally, one or more parts of artifact source application 230 can be part of system memory 804 (of FIG. 20), on other computers and/or applications 815 (of FIG. 20), or other such variations as would occur to one in the computer software art.

Artifact source application 230 includes program logic 234, which is responsible for carrying out some or all of the techniques described herein. Program logic 234 includes logic for allowing artifacts (source code, etc.) to be created/updated from one or more components of the artifact source application(s) 236; logic for optionally receiving instructions from one or more custom providers regarding changes to make to one or more artifacts (e.g. such as in cases, if any, when a custom provider wants the artifact source application to make the change instead of the custom provider making the change directly) 238; logic for displaying artifacts that have been updated and/or added by custom providers that were registered by a modeling application 240; and other logic for operating the application 250. In one implementation, program logic 234 is operable to be called programmatically from another program, such as using a single call to a procedure in program logic 234.

Figure 4:
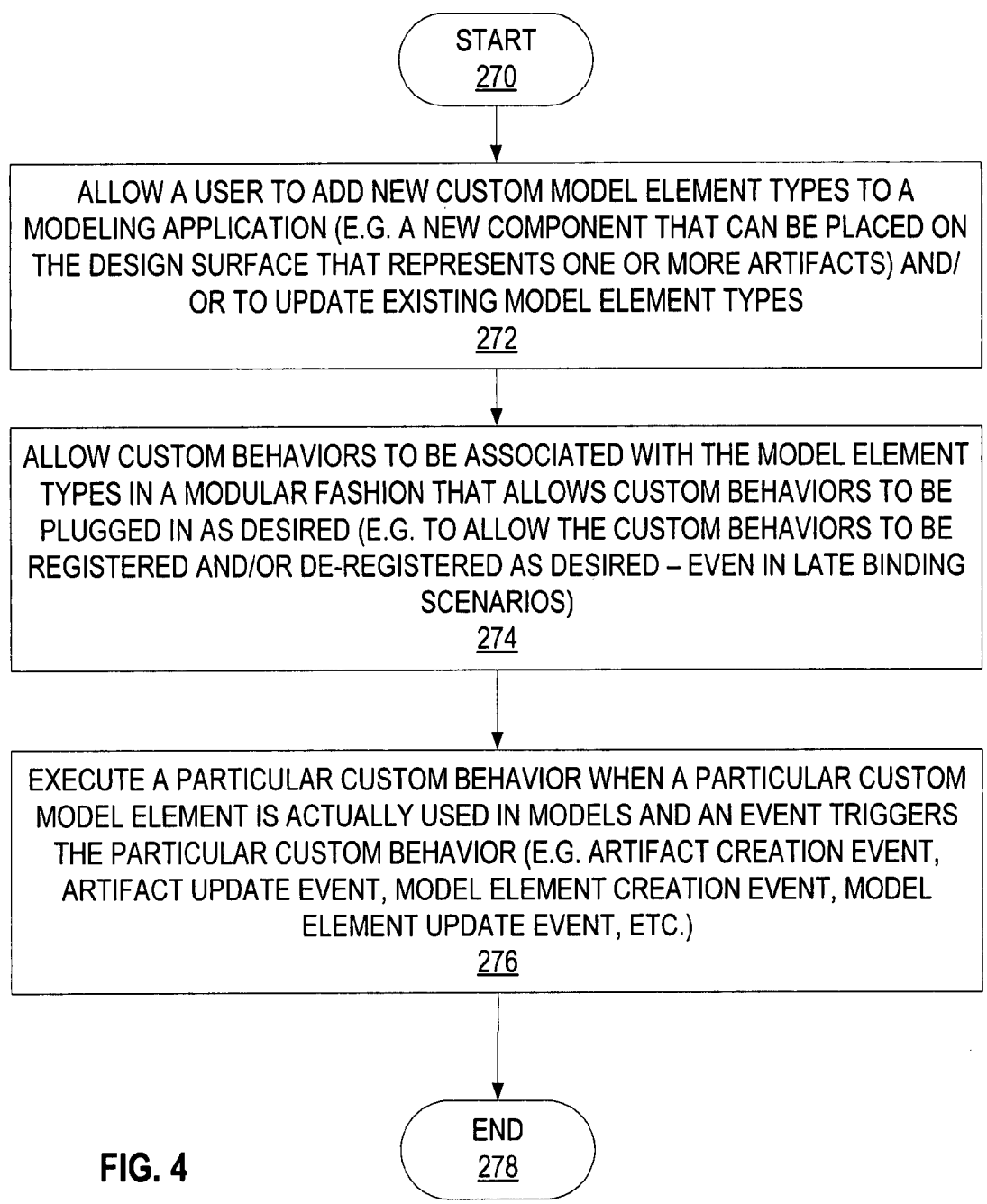
FIG. 4 is a high-level process flow diagram for one implementation of the system of FIG. 1.

Turning now to FIGS. 4-18 with continued reference to FIGS. 1-3, the stages for implementing one or more implementations of modeling application 200 and artifact source application 230 are described in further detail. FIG. 4 is a high level process flow diagram for one implementation of the system of FIG. 1. In one form, the process of FIG. 4 is at least partially implemented in the operating logic of computing device 800 (of FIG. 20). The procedure begins at start point 270 with allowing a user to add new custom model element types to a modeling application and/or to update existing model element types (stage 272). An example of a custom model element is a new component that can be placed on the design surface that represents one or more artifacts. Custom behavior can be associated with the model element types in a modular fashion that allows custom behaviors to be plugged in as desired (e.g. registered and/or de-registered as desired—even in a late binding scenario) (stage 274). In one implementation, the term late binding means allowing changes to be made to the model even after a model has already been created and used. For example, a new type of model element and its custom behavior can be added. Alternatively or additionally, custom behavior associated with a pre-existing model element can be added or modified. In one implementation, the custom behaviors are used to specify what actions should take place when the model element is used and/or changed. The custom behavior is executed for a particular custom model element when the particular custom model element is actually used in the models and an event triggers the particular custom behavior (e.g. artifact creation event, artifact update event, model element creation event, model element update event, etc.) (stage 276). The process ends at end point 278.

Figure 5:
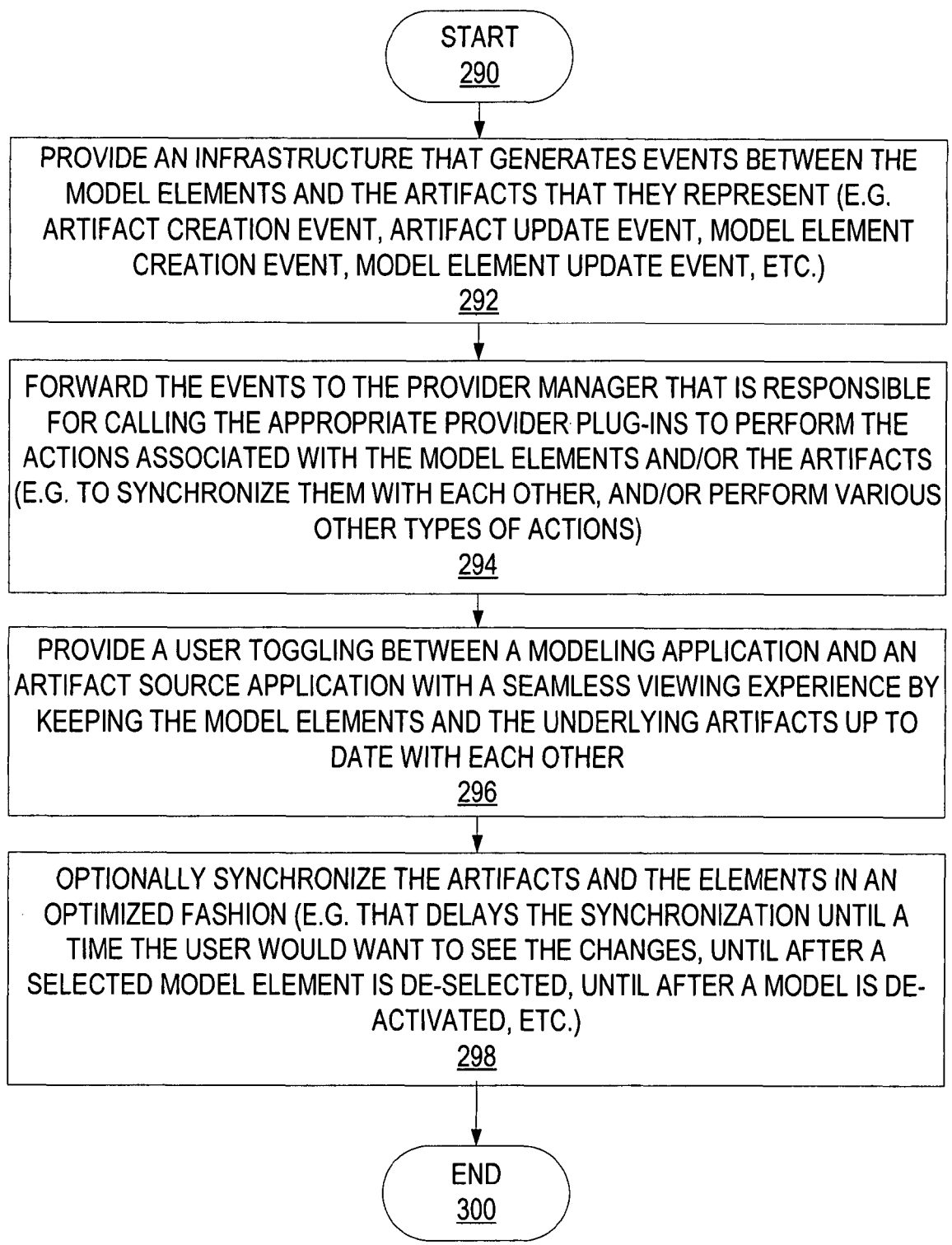
FIG. 5 is a process flow diagram for one implementation of the system of FIG. 1 illustrating the more detailed stages involved in allowing custom behavior to be associated with model elements.

FIG. 5 is a process flow diagram for one implementation of the system of FIG. 1 illustrating the more detailed stages involved in allowing custom behavior to be associated with model elements. In one form, the process of FIG. 5 is at least partially implemented in the operating logic of computing device 800 (of FIG. 20). The procedure begins at start point 290 with providing an infrastructure that generates events between the model elements and the artifacts that they represent (e.g. artifact creation event, artifact update event, model element creation event, model element update event, etc.) (stage 292). The events are forwarded to a provider manager that is responsible for calling the appropriate provider plug-ins to perform the actions associated with the model elements and/or the artifacts (e.g. to synchronize them with each other, and/or perform various other types of actions) (stage 294). A user toggling between a modeling application and an artifact source application are provided with a seamless viewing experience by keeping the model elements and the underlying artifacts up to date with each other (stage 296).

The artifacts and the elements are optionally synchronized in an optimized fashion (e.g. that delays the synchronization until a time the user would want to see the changes, until after a selected model element is de-selected, until after a model is de-activated, etc.) (stage 298). Synchronization optimizations can be performed based upon change detection, aggregation, user selection context, etc. For example, some synchronization optimizations related to change detection include: (1) using a calculated hash value, determine if the model element has changed. If it has changed, update artifacts accordingly. (2) Using a calculated hash value, determine if the artifacts have changed. If they have changed, refresh the model accordingly. With respect to aggregation, the provider manager can buffer event calls so that it can optimize their associated behavior invocation. For example, if multiple artifact updates are required for a model element, they can be combined into a single artifact update. A synchronization optimization related to user selection context includes only updating/refreshing the subset of the model elements that the user is viewing and/or modifying. Numerous other synchronization optimizations are also possible. The process ends at end point 300.

Figure 6:
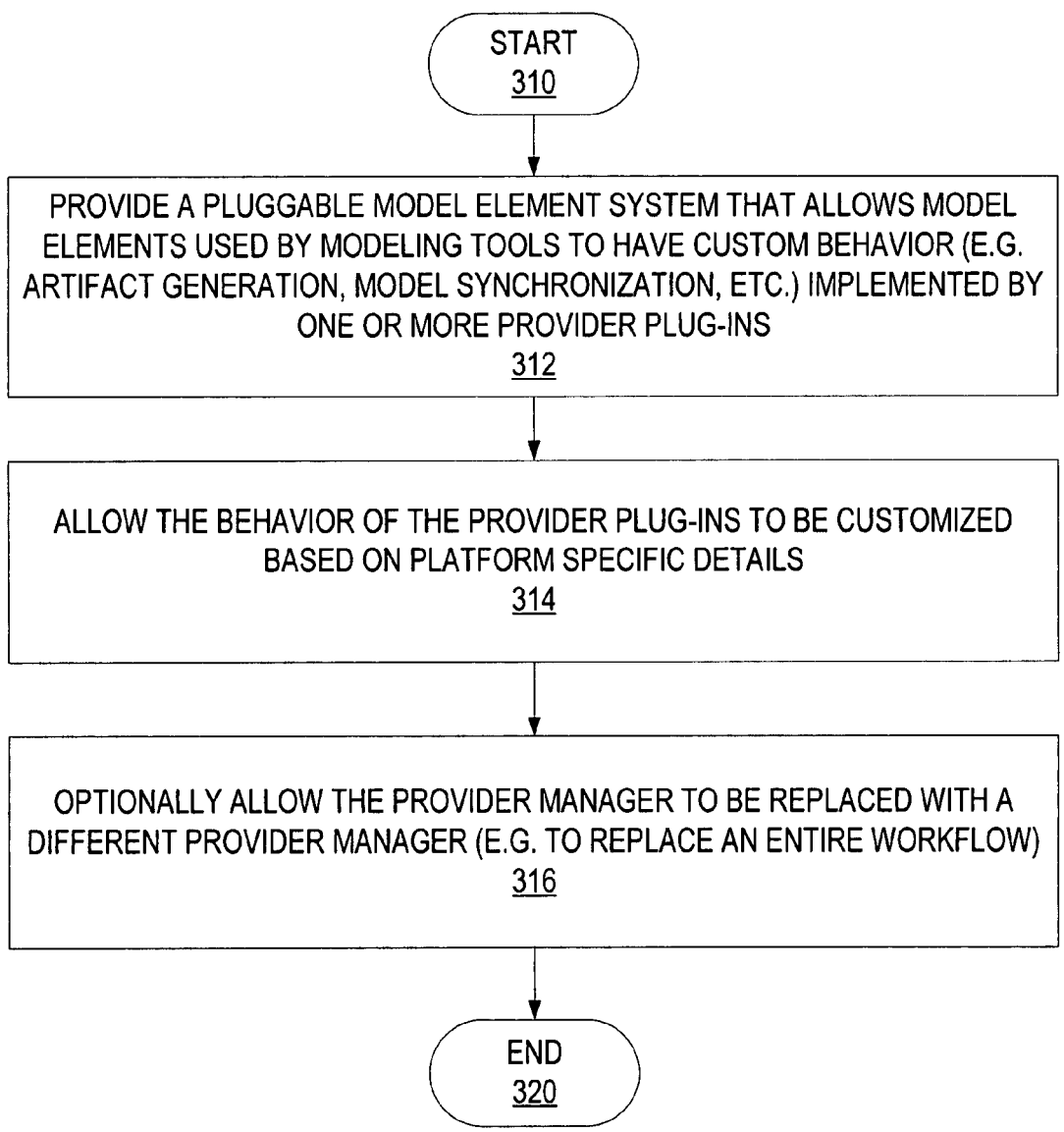
FIG. 6 is a process flow diagram for one implementation of the system of FIG. 1 illustrating the stages involved in providing pluggable model elements that can be extended by third parties.

FIG. 6 is a process flow diagram for one implementation of the system of FIG. 1 illustrating the stages involved in providing pluggable model elements that can be extended by third parties. In one form, the process of FIG. 6 is at least partially implemented in the operating logic of computing device 800 (of FIG. 20). The procedure begins at start point 310 with providing a pluggable model element system that allows model elements used by modeling tools to have custom behavior (e.g. artifact generation, model synchronization, etc.) implemented by one or more provider plug-ins (stage 312). The behavior of the provider plug-ins can be customized based on platform specific details (stage 314), and one or more provider plug-ins can be associated with a particular model element. The provider manager can optionally be replaced with a different provider manager (e.g. to replace an entire workflow) (stage 316). This allows the workflow of provider invocations to be further customized. The process ends at end point 320.

Figure 7:
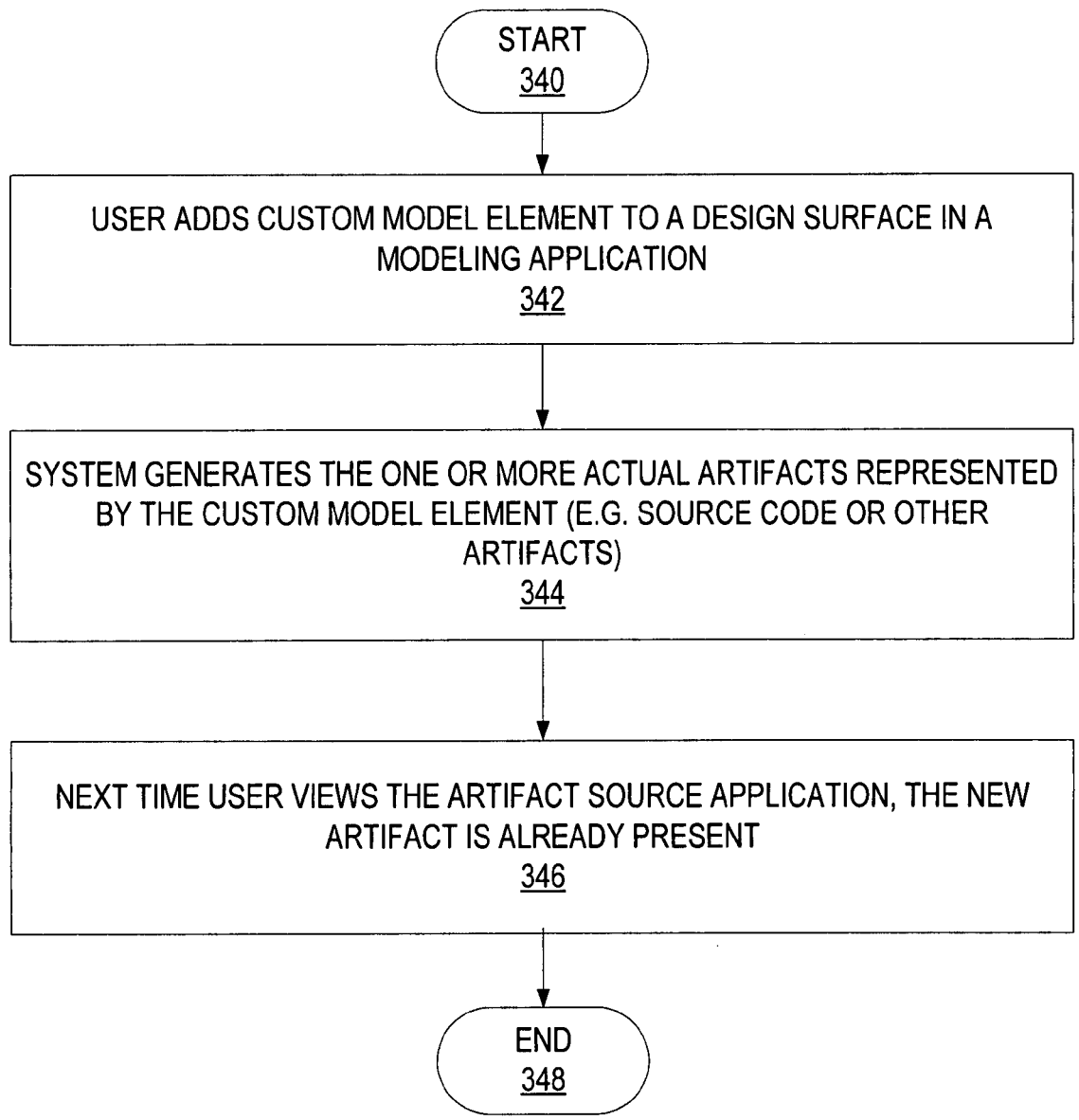
FIG. 7 is a process flow diagram for one implementation of the system of FIG. 1 illustrating the stages involved in automatically creating an underlying artifact based upon the creation of a custom model element representing the artifact in a modeling application.

FIG. 7 is a process flow diagram for one implementation of the system of FIG. 1 illustrating the stages involved in automatically creating an underlying artifact based upon the creation of a custom model element representing the artifact in a modeling application. In one form, the process of FIG. 7 is at least partially implemented in the operating logic of computing device 800 (of FIG. 20). The procedure begins at start point 340 with the user adding custom model elements to a design surface in a modeling application (stage 342). The system generates the one or more actual artifacts represented by the custom model element (e.g. source code or other artifacts) (stage 344). The next time the user views the artifact source application, the new artifact is already present (stage 346). The process ends at end point 348.

Figure 8:
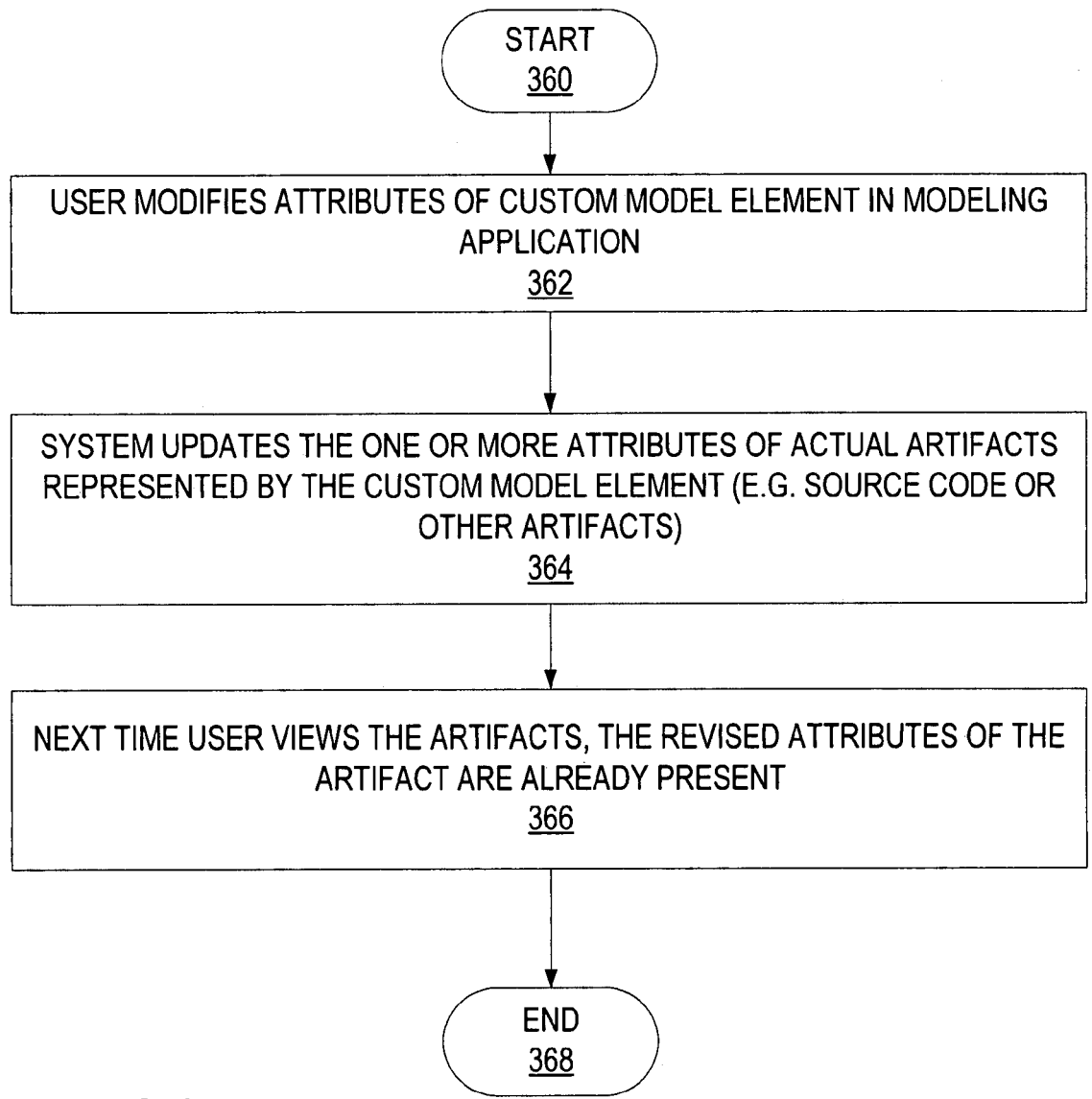
FIG. 8 is a process flow diagram for one implementation of the system of FIG. 1 illustrating the stages involved in automatically updating an underlying artifact based upon the revision of a custom model element representing the artifact in a modeling application.

FIG. 8 is a process flow diagram for one implementation of the system of FIG. 1 illustrating the stages involved in automatically updating an underlying artifact based upon the revision of a custom model element representing the artifact in a modeling application. In one form, the process of FIG. 8 is at least partially implemented in the operating logic of computing device 800 (of FIG. 20). The procedure begins at start point 360 with the user modifying the attributes of custom model elements in the modeling application (stage 362). The system updates the one or more attributes of actual artifacts represented by the custom model element (e.g. source code or other artifacts) (stage 364). The next time the user views the artifacts, the revised attributes of the artifact are already present (stage 366). The process ends at end point 368.

Figure 9:
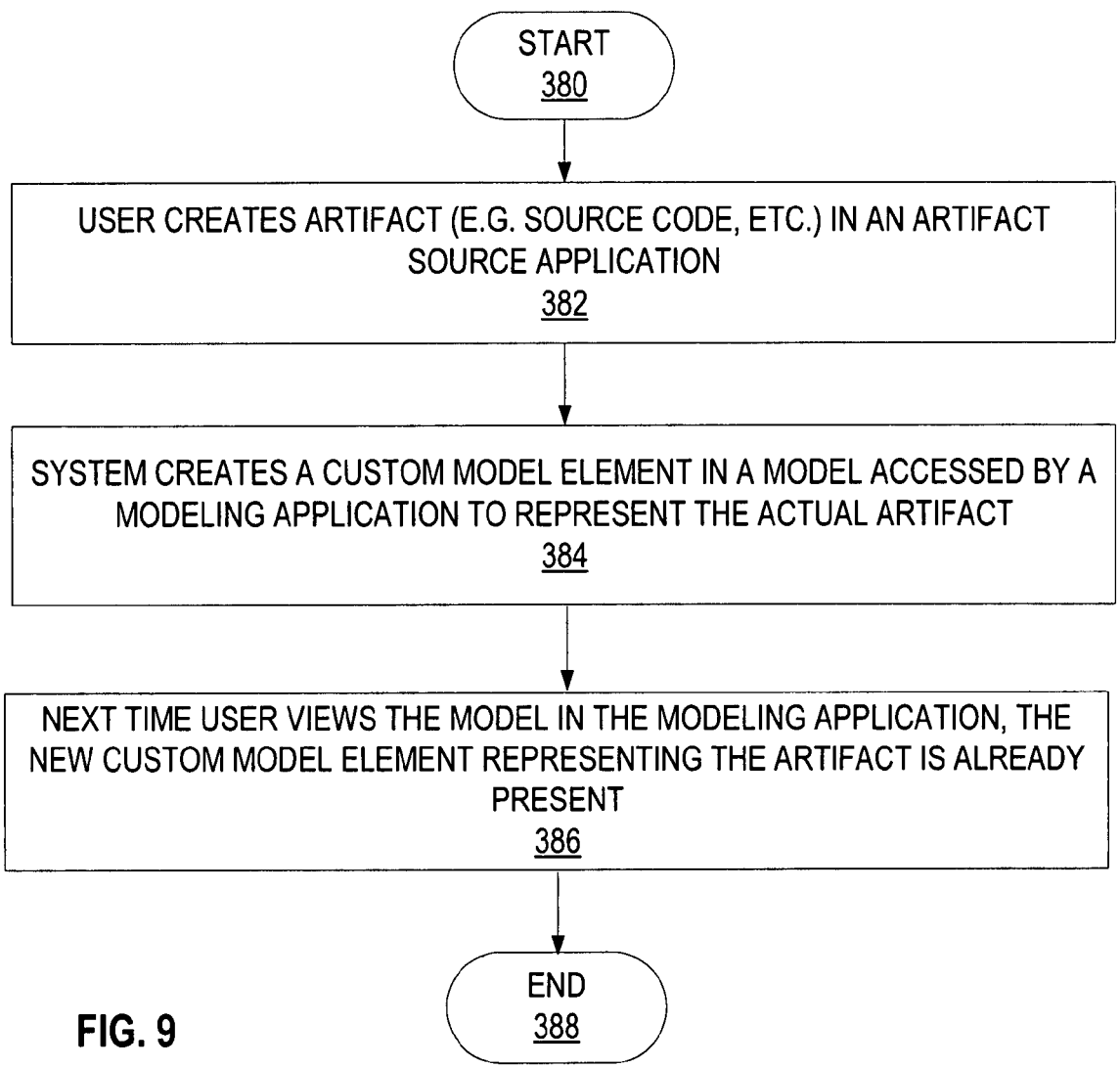
FIG. 9 is a process flow diagram for one implementation of the system of FIG. 1 illustrating the stages involved in automatically creating a model element that represents one or more artifacts in a modeling application upon the creation of a new artifact in an artifact source application.

FIG. 9 is a process flow diagram for one implementation of the system of FIG. 1 illustrating the stages involved in automatically creating a model element that represents one or more artifacts in a modeling application upon the creation of a new artifact in an artifact source application. In one form, the process of FIG. 9 is at least partially implemented in the operating logic of computing device 800 (of FIG. 20). The procedure begins at start point 380 with the user creates artifact (e.g. source code, etc.) in an artifact source application (stage 382). The system creates a custom model element in a model accessed by a modeling application to represent the actual artifact (stage 384). The next time the user views the model in the modeling application, the new custom model element representing the artifact is already present (stage 386). The process ends at end point 388.

Figure 10:
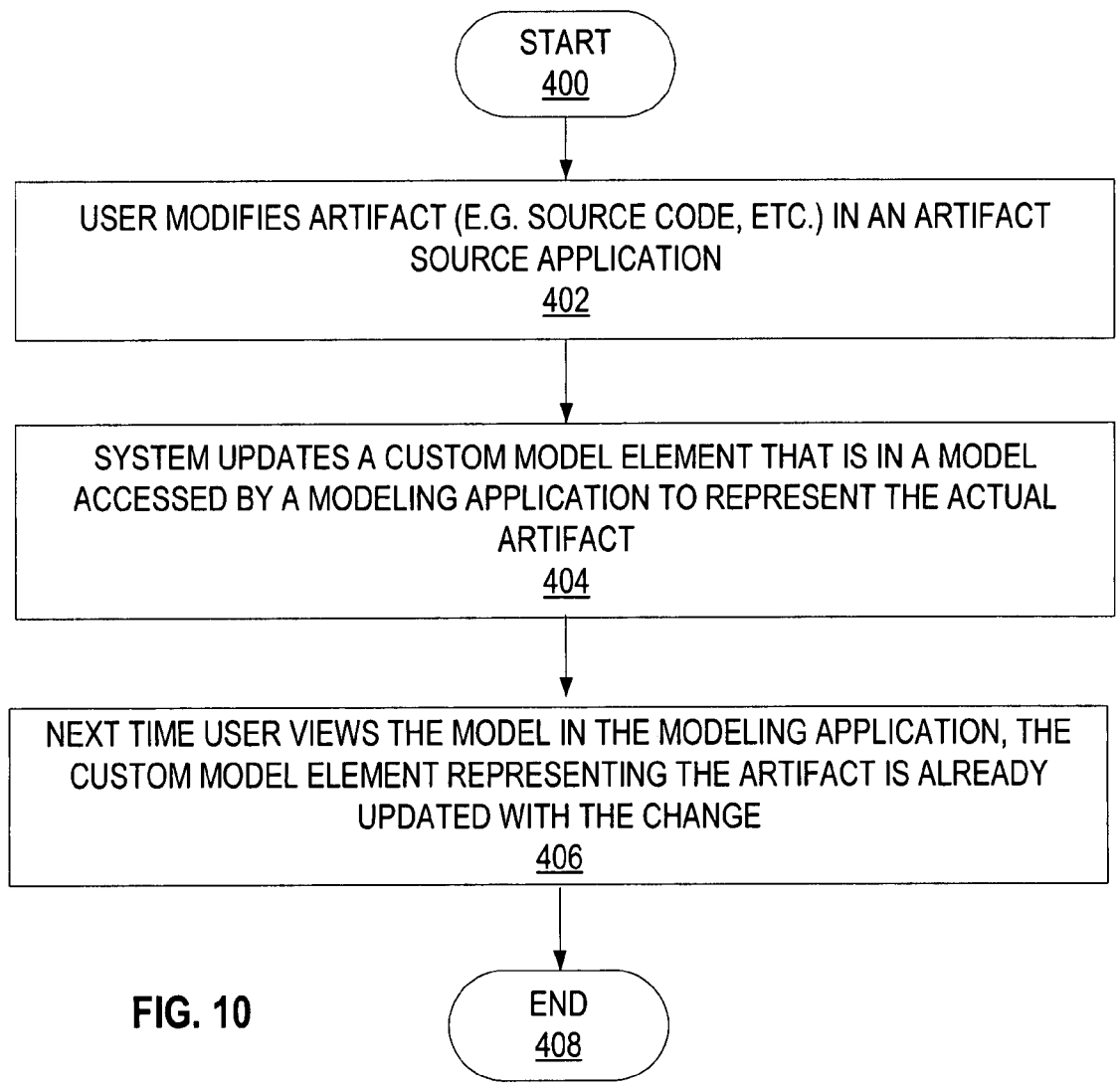
FIG. 10 is a process flow diagram for one implementation of the system of FIG. 1 illustrating the stages involved in automatically updating a model element that represents one or more artifacts in a modeling application upon the revision of an artifact in an artifact source application.

FIG. 10 is a process flow diagram for one implementation of the system of FIG. 1 illustrating the stages involved in automatically updating a model element that represents one or more artifacts in a modeling application upon the revision of an artifact in an artifact source application. In one form, the process of FIG. 10 is at least partially implemented in the operating logic of computing device 800 (of FIG. 20). The procedure begins at start point 400 with the user modifying the artifact (e.g. source code, etc.) in an artifact source application (stage 402). The system updates a custom model element that is in a model accessed by modeling application to represent the actual artifact (stage 404). The next time the user views the model in the modeling application, the custom model element representing the artifact is already updated with the change (stage 406). The process ends at end point 408.

Figure 11:
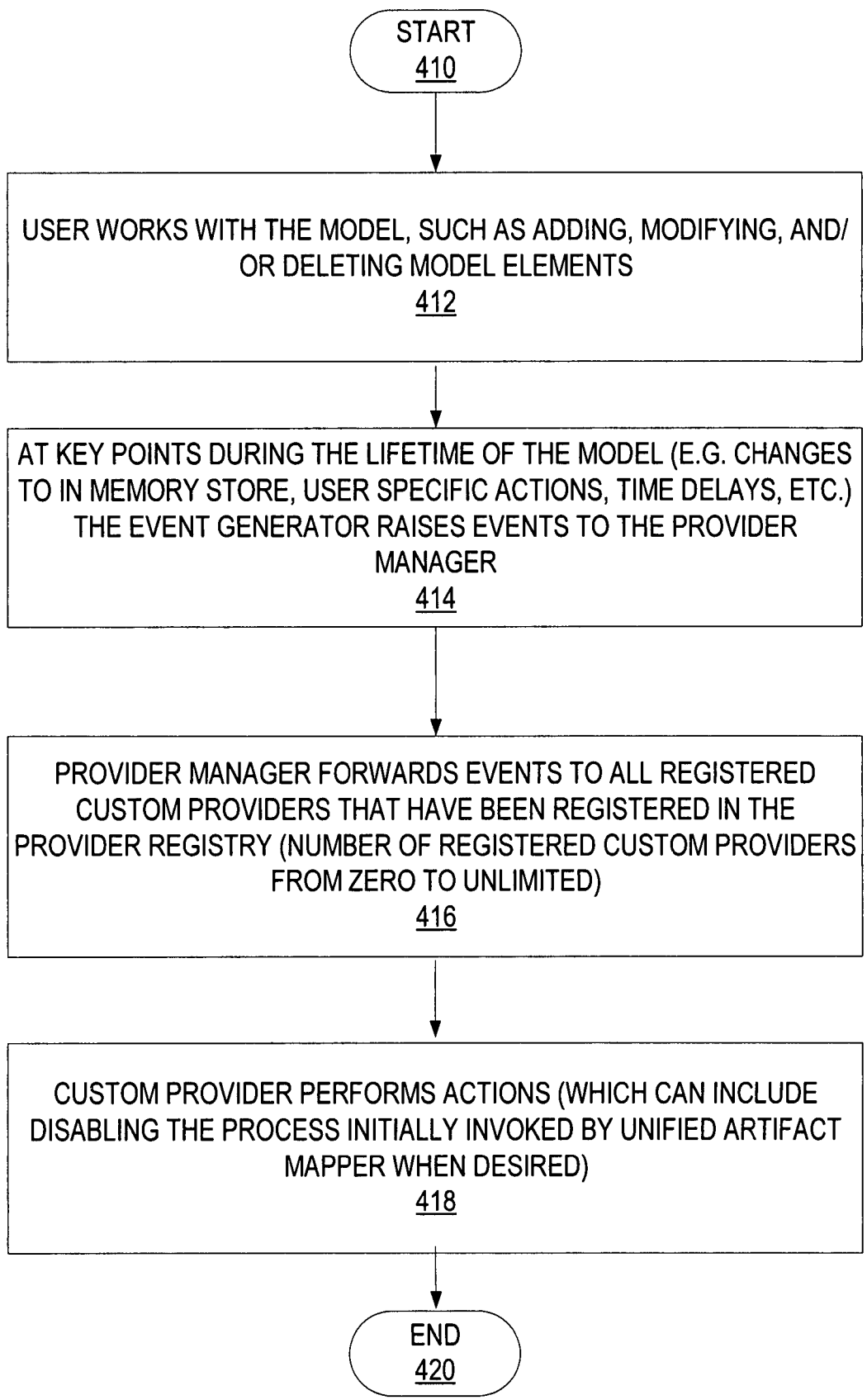
FIG. 11 is a process flow diagram for one implementation of the system of FIG. 1 illustrating the stages involved in performing synchronization between artifacts and model elements when changes are made to the model.

FIG. 11 is a process flow diagram for one implementation of the system of FIG. 1 illustrating the stages involved in performing synchronization between artifacts and model elements when changes are made to the model. In one form, the process of FIG. 11 is at least partially implemented in the operating logic of computing device 800 (of FIG. 20). The procedure begins at start point 410 with the user working with the model, such as adding, modifying, and/or deleting model elements (stage 412). At key points during the lifetime of the model (e.g. changes to the in memory store, user specific actions, time delays, etc.) the event generator raises events to the provider manager (stage 414). The provider manager forwards events to all registered custom providers that have been registered in the provider registry (number of registered custom providers from zero to unlimited) (stage 416). The custom provider performs actions (which can include disabling the process initially invoked by unified artifact mapper when desired) (stage 418). The process ends at end point 420.

Figure 12:
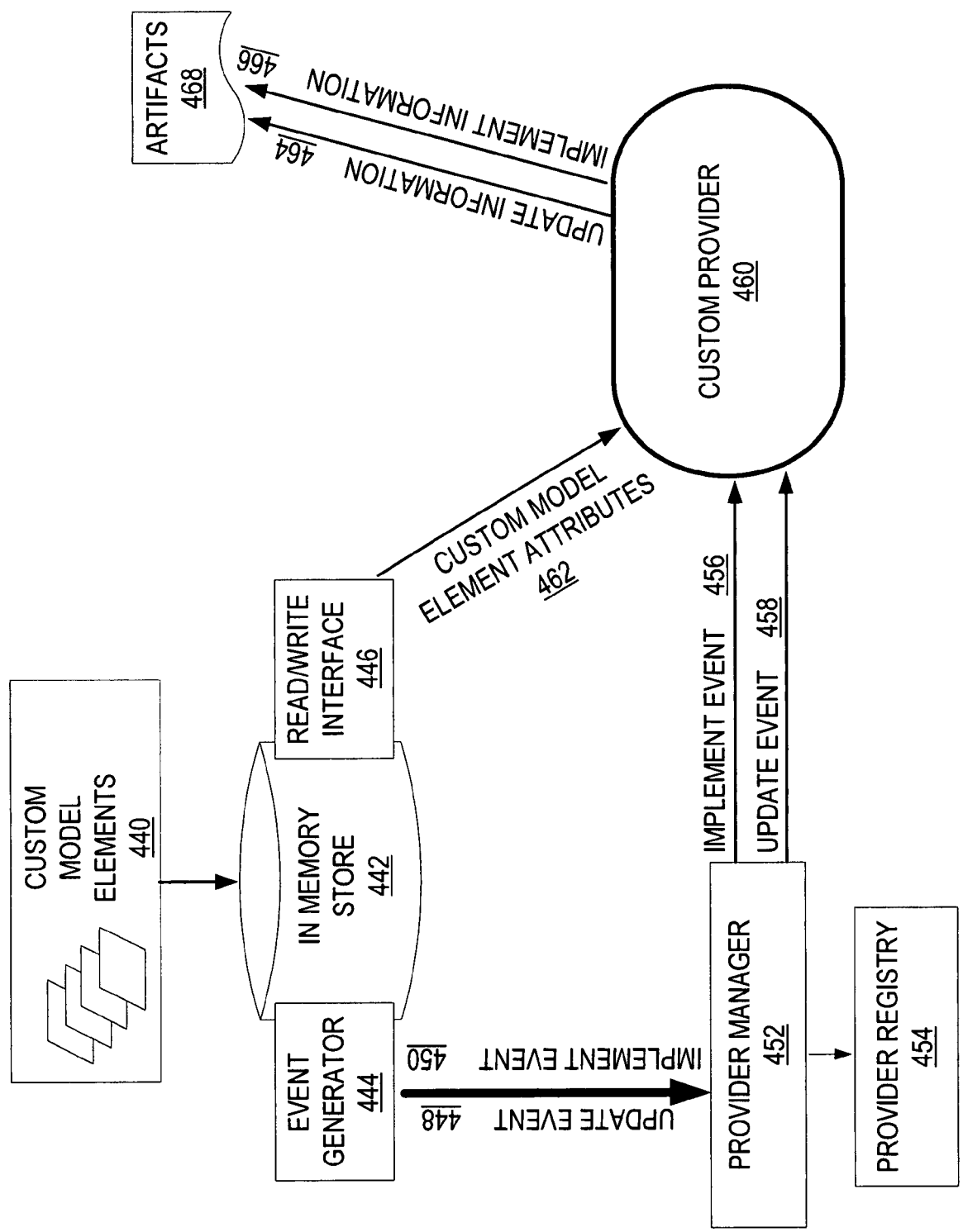
FIG. 12 is a diagrammatic view for one implementation of the system in FIG. 1 illustrating where model elements have been created or modified and artifacts are synchronized.

FIG. 12 is a diagrammatic view for one implementation of the system in FIG. 1 illustrating where model elements have been created or modified and artifacts are synchronized. Custom model elements 440 are persisted to in memory store 442. This causes event generator 444 to optionally issue update event 448, implement event 450, or both of them to provider manager 452. Update event 448 is issued when a custom model element has been modified. Implement event 450 is issued when a custom model element is created.

Provider manager 452 receives the events and then optionally issue update event 458, implement event 456, or both of them to any custom providers that have been registered with provider registry 454. In FIG. 12, custom provider 460 has been registered with provider registry 454 and will optionally receive update event 458, implement event 456, or both.

After receiving events from provider manager 452, custom provider 460 interacts with read/write interface 446 to get custom model element attributes 462. If custom provider 460 has received implement event 456, it will use custom model element attributes 462 to issue implementation information 466 which, ultimately, will create artifacts 468. If custom provider 460 has received update event 458, it will use custom model element attributes 462 to issue implementation information 466 which, ultimately, will modify artifacts 468.

Figure 13:
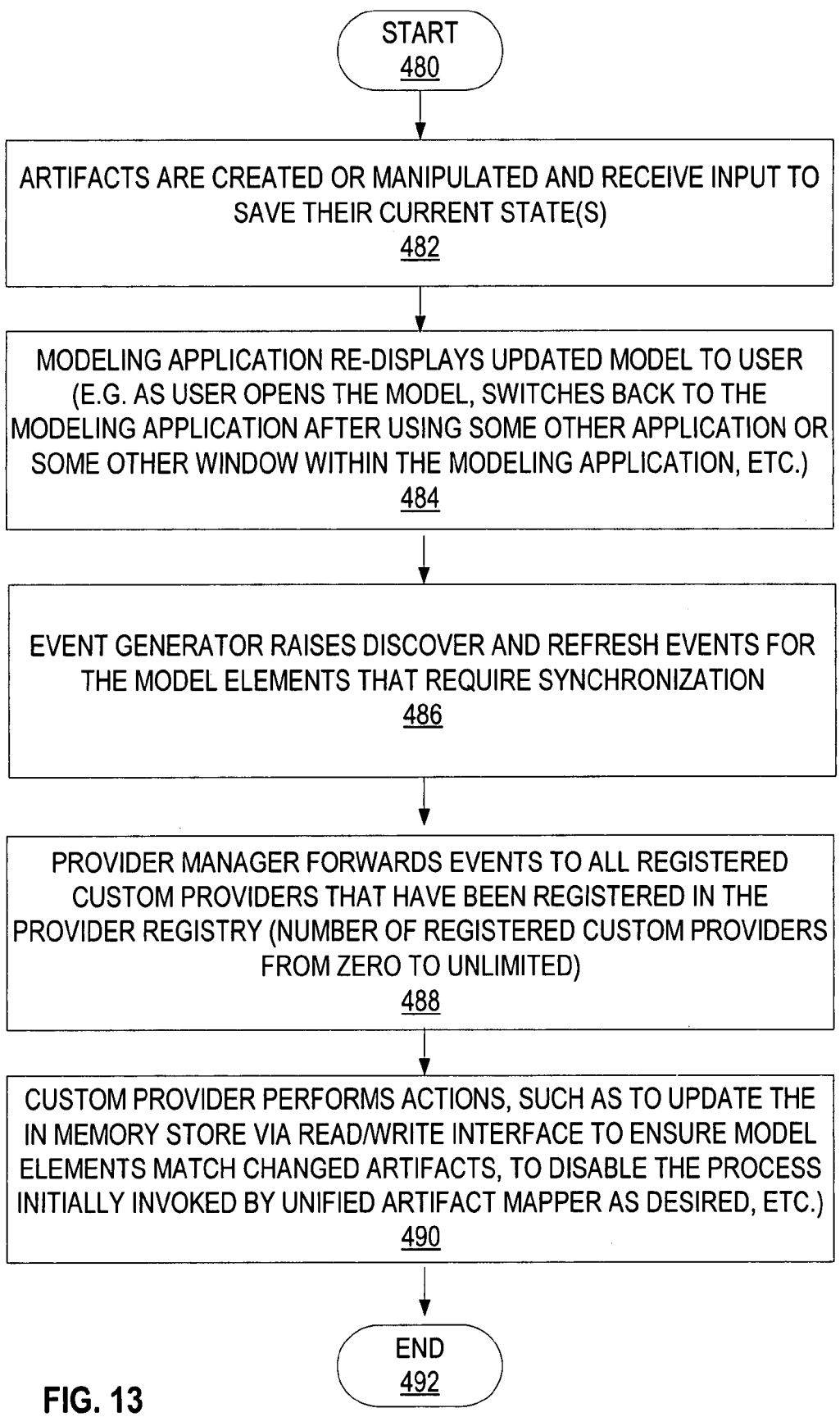
FIG. 13 is a process flow diagram for one implementation of the system of FIG. 1 illustrating the stages involved in performing synchronization between artifacts and model elements when changes are made to the artifacts.

FIG. 13 is a process flow diagram for one implementation of the system of FIG. 1 illustrating the stages involved in performing synchronization between artifacts and model elements when changes are made to the artifacts. In one form, the process of FIG. 13 is at least partially implemented in the operating logic of computing device 800 (of FIG. 20). The procedure begins at start point 480 with the artifacts being created or manipulated and receiving input to save their current state(s) (stage 482). The modeling application re-displays the updated model to user (e.g. as user opens the model, switches back to the modeling application after using some other application or some other window within the modeling application, etc.) (stage 484). The event generator raises discover and refresh events for the model elements that require synchronization (stage 486). The provider manager forwards the events to all the registered custom providers that have been registered in the provider registry (number of registered custom providers from zero to unlimited) (stage 488). The custom provider performs actions, such as to update the In Memory Store via the read/write interface to ensure model elements match the changed artifacts, to disable the process initially invoked by unified artifact mapper as desired, etc. (stage 490). The process ends at end point 492.

Figure 14:
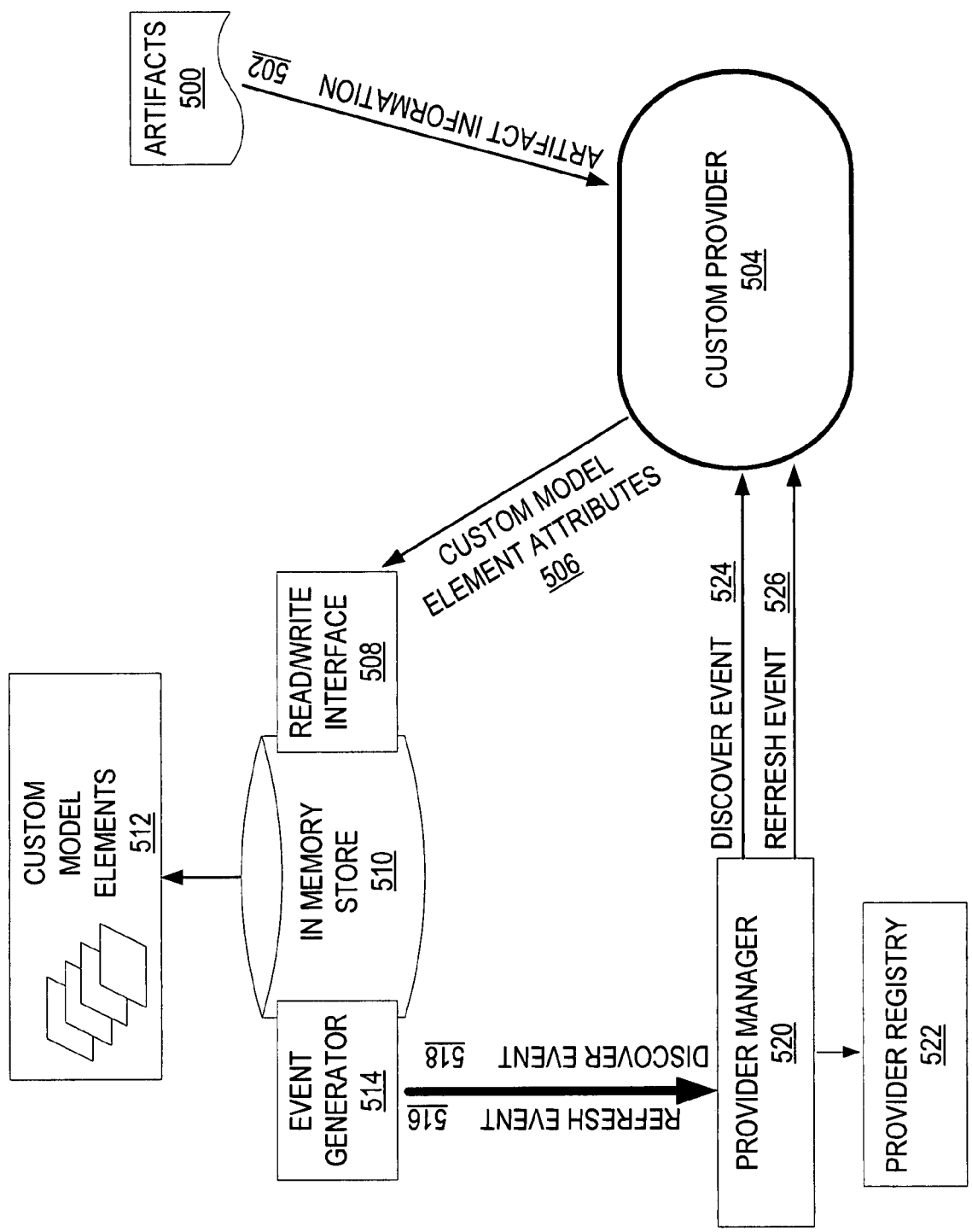
FIG. 14 is a diagrammatic view for one implementation of the system in FIG. 1 illustrating where artifacts have been created or modified and model elements are synchronized.

FIG. 14 is a diagrammatic view for one implementation of the system in FIG. 1 illustrating where artifacts have been created or modified and model elements are synchronized. Artifacts 500 are changed in some fashion and saved. This will cause event generator 514 to optionally issue refresh event 516, discover event 518, or both to provider manager 520. Refresh event 516 is issued when an artifact is modified and a custom model element exists within the model. Discover event 518 is issued when an artifact is created and a custom model element does not exist within the model.

Provider manager 520 receives the events and will then optionally issue refresh event 516, discover event 518, or both to any custom providers that have been registered with provider registry 522. In FIG. 14, custom provider 504 has been registered with provider registry 522 and will optionally receive refresh event 526, discover event 524, or both.

After receiving events from provider manager 520, custom provider 504 interacts with artifacts 500 to collect artifact information 502. If custom provider 504 has received discover event 524, it will use artifact information 502 to issue commands to read/write interface 508 which, ultimately, will create custom model elements 512. If custom provider 504 has received refresh event 526, it will use artifact information 502 to issue commands to read/write interface 508 which, ultimately, will modify custom model elements 512.

Figure 15:
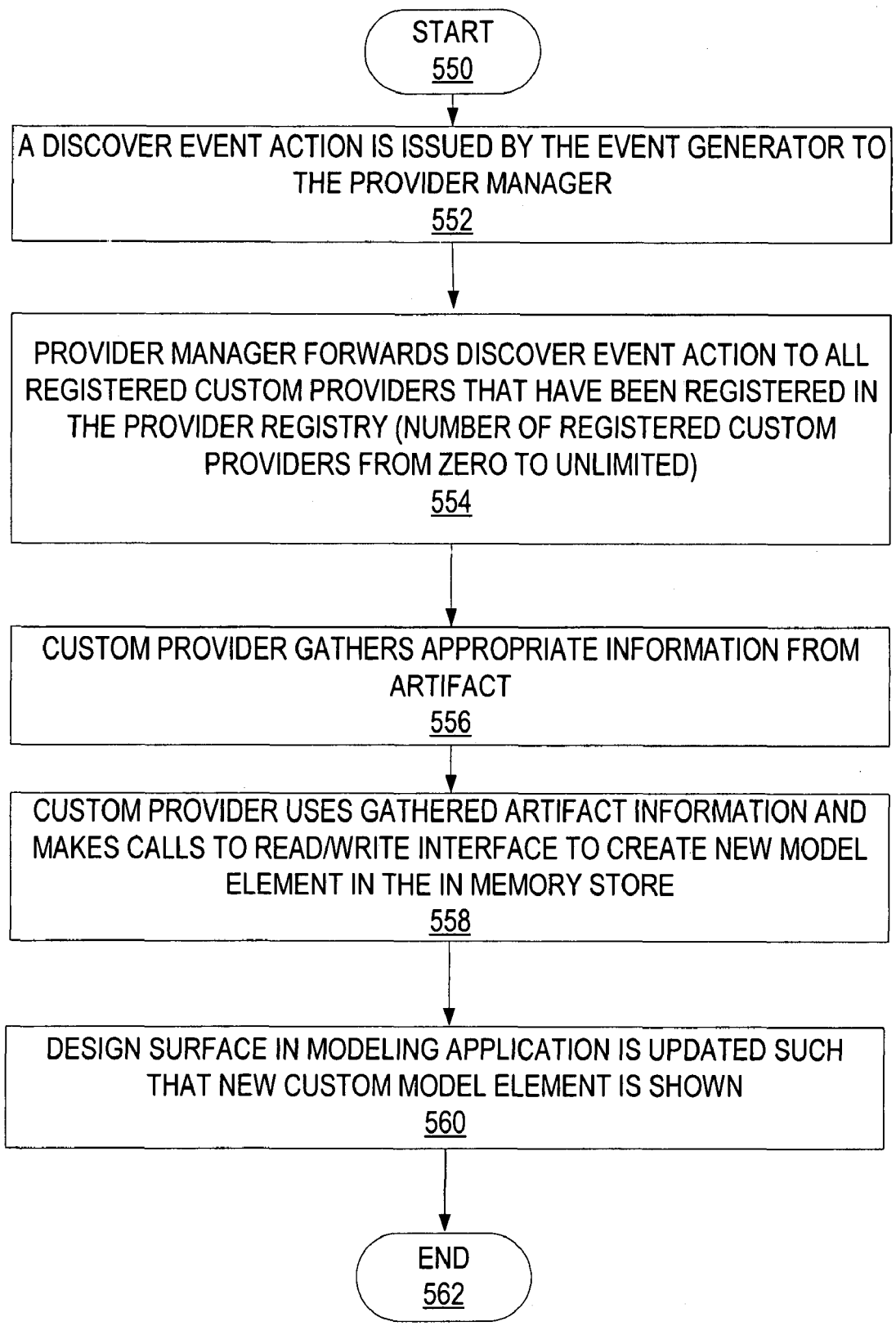
FIG. 15 is a process flow diagram for one implementation of the system of FIG. 1 illustrating the stages involved in raising and responding to a discover event when a new artifact is created in an artifact source application.

FIG. 15 is a process flow diagram for one implementation of the system of FIG. 1 illustrating the stages involved in raising and responding to a discover event when a new artifact is created in an artifact source application. In one form, the process of FIG. 15 is at least partially implemented in the operating logic of computing device 800 (of FIG. 20). The procedure begins at start point 550 with a discover event action is issued by the event generator to the provider manager (stage 552). The provider manager forwards the discovery event action to all registered custom providers that have been registered in the provider registry (number of registered custom providers from zero to unlimited) (stage 554). The custom provider gathers appropriate information from the artifact (stage 556). The custom provider uses gathered artifact information and makes calls to read/write interface to create new model elements in the memory store (stage 558). The design surface in the modeling application is updated such that the new custom model element is shown (stage 560). The process ends at end point 562.

Figure 16:
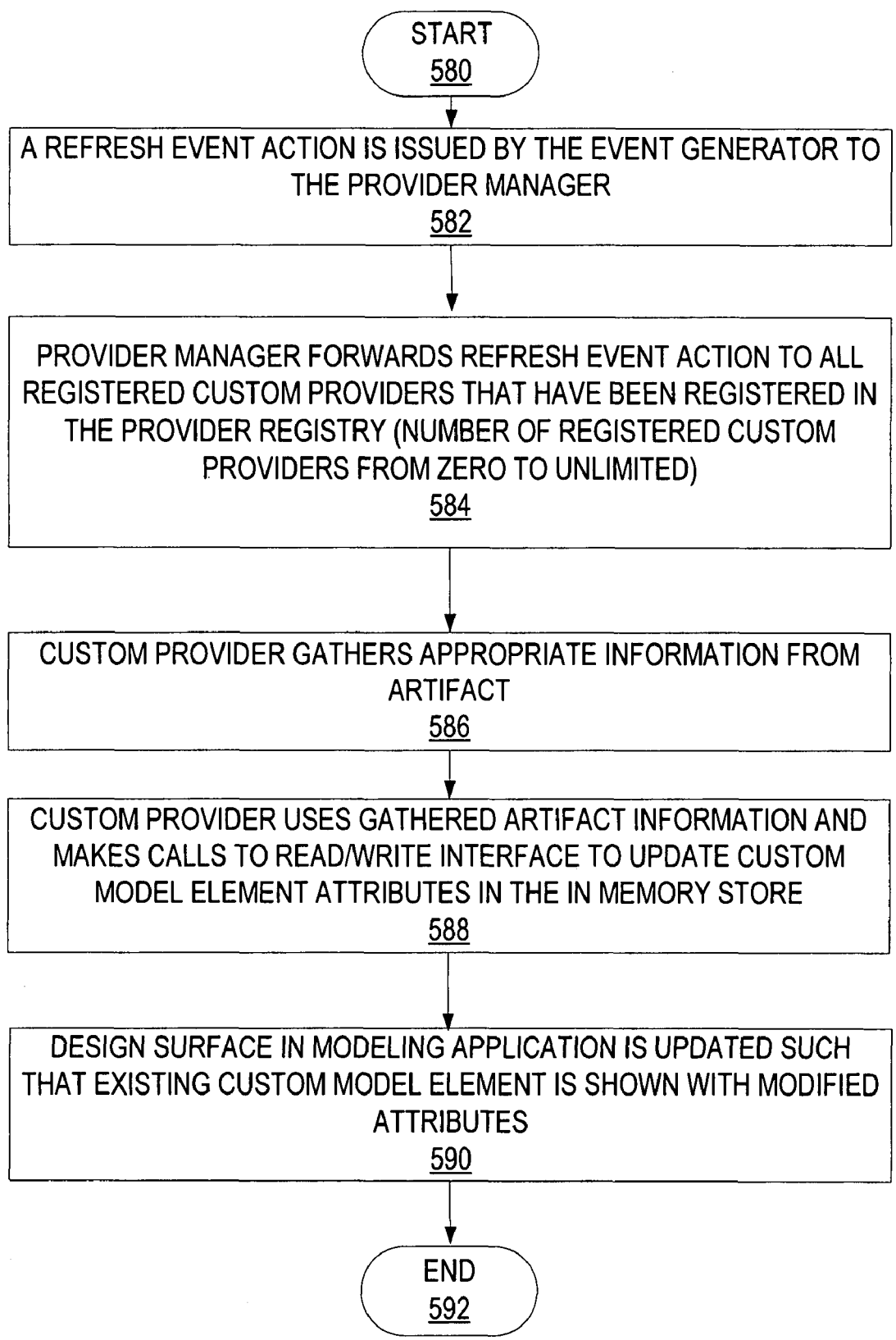
FIG. 16 is a process flow diagram for one implementation of the system of FIG. 1 illustrating the stages involved in raising and responding to a refresh event when an artifact is updated in an artifact source application.

FIG. 16 is a process flow diagram for one implementation of the system of FIG. 1 illustrating the stages involved in raising and responding to a refresh event when an artifact is updated in an artifact source application. In one form, the process of FIG. 16 is at least partially implemented in the operating logic of computing device 800 (of FIG. 20). The procedure begins at start point 580 with a refresh event action is issued by the event generator to the provider manager (stage 582). The provider manager forwards refresh event action to all registered custom providers that have been registered in the provider registry (number of registered custom providers from zero to unlimited) (stage 584). The custom provider gathers appropriate information from the artifact (stage 586). The custom provider uses gathered artifact information and makes calls to the read/write interface to update custom model element attributes in the in memory store (stage 588). The design surface in the modeling application is updated such that the existing custom model element is shown with modified attributes (stage 590). The process ends at end point 592.

Figure 17:
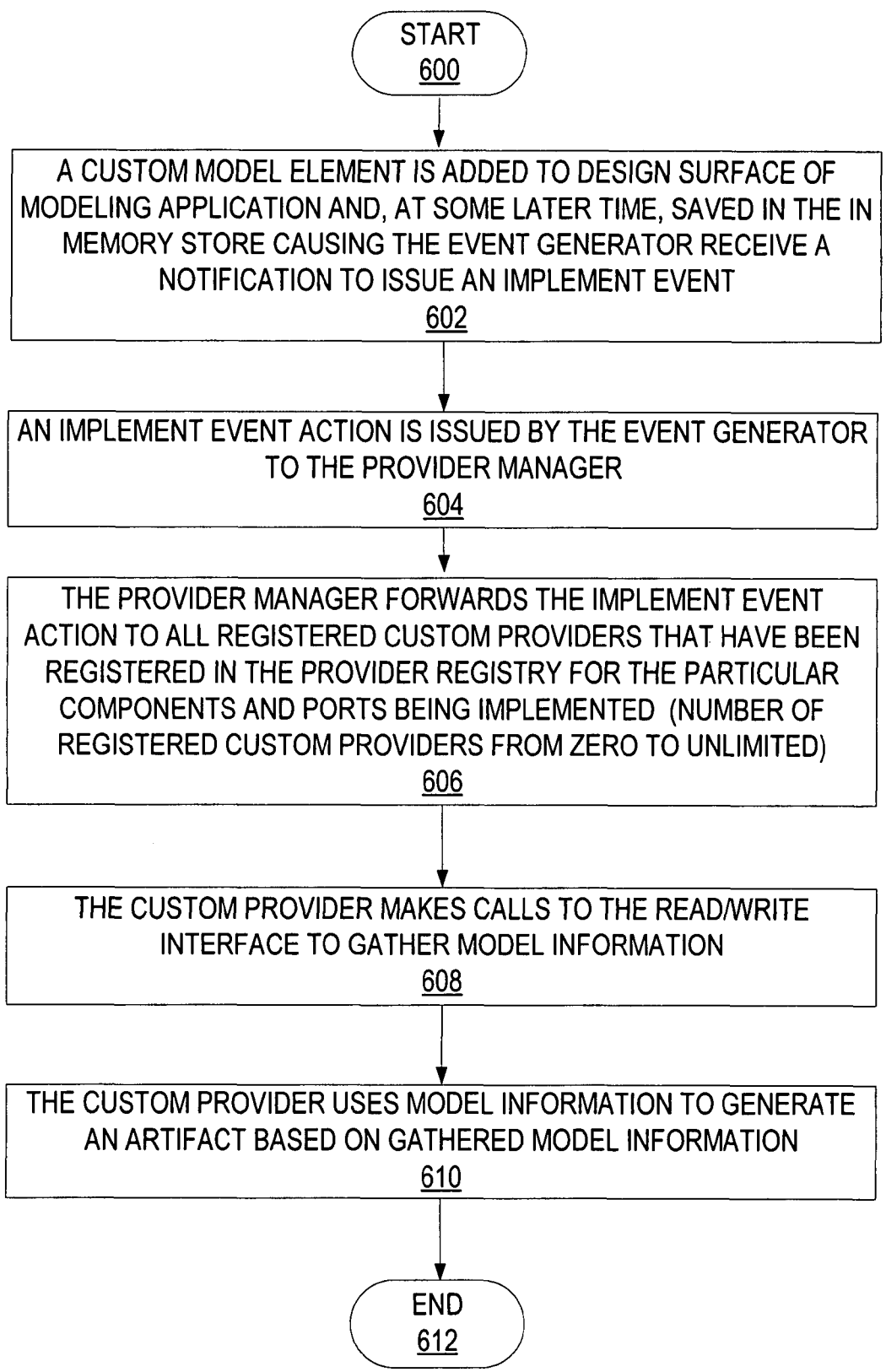
FIG. 17 is a process flow diagram for one implementation of the system of FIG. 1 illustrating the stages involved in raising and responding to an implement event when a model element is created in a modeling application.

FIG. 17 is a process flow diagram for one implementation of the system of FIG. 1 illustrating the stages involved in raising and responding to an implement event when a model element is created in a modeling application. In one form, the process of FIG. 17 is at least partially implemented in the operating logic of computing device 800 (of FIG. 20). The procedure begins at start point 600 with a custom model element is added to the design surface of the modeling application and, at some later time, saved in the in memory store causing the event generator to receive a notification to issue an implement event (stage 602). An implemented event action is issued by the event generator to the provider manager (stage 604). The provider manager forwards the implemented event action to all registered custom providers that have been registered in the provider registry for the particular components and ports being implemented (number of registered custom providers from zero to unlimited) (stage 606). The custom provider makes calls to the read/write interface to gather model information (stage 608). The custom provider uses model information to generate an artifact based on gathered model information (stage 610). The process ends at end point 612.

Figure 18:
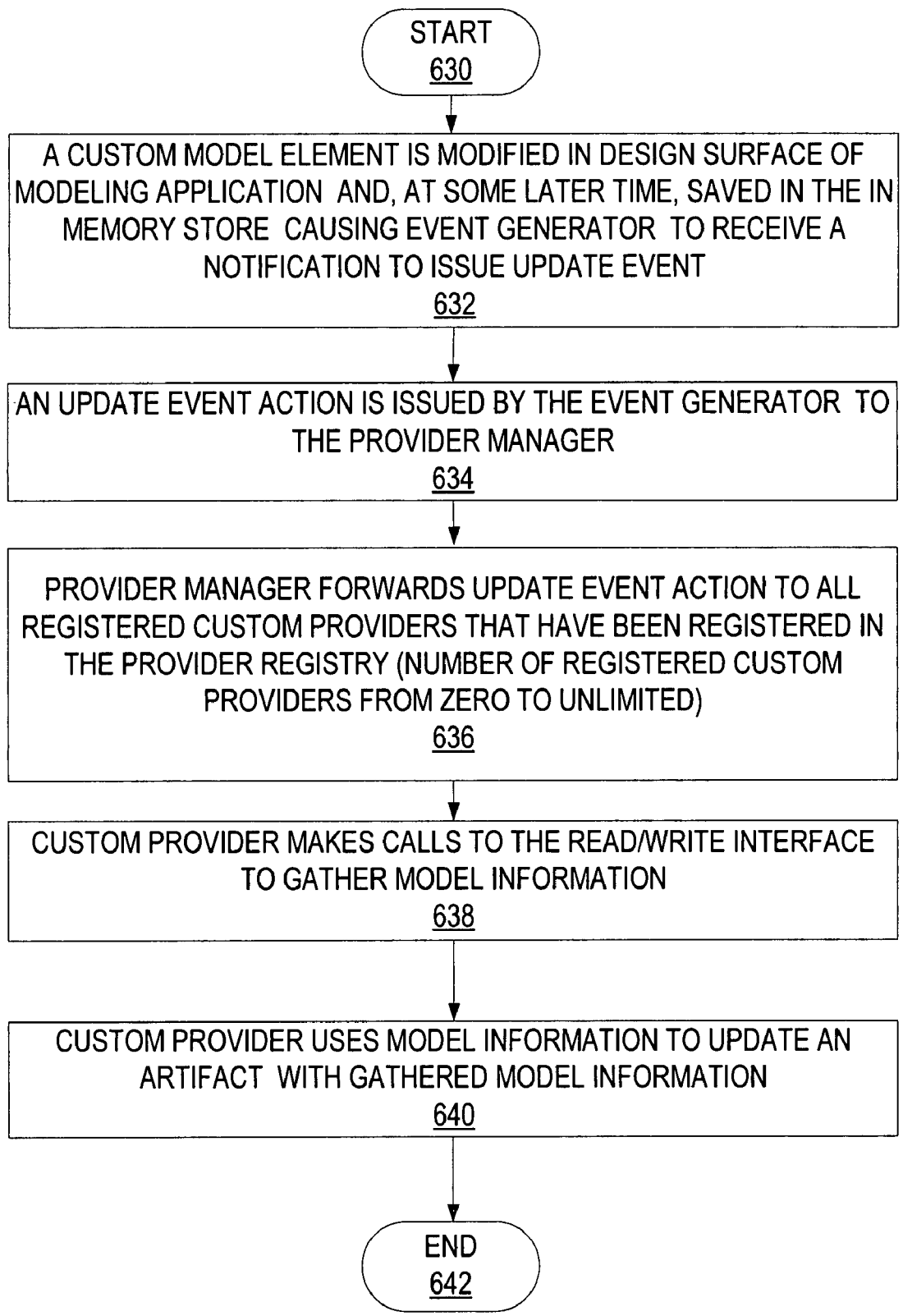
FIG. 18 is a process flow diagram for one implementation of the system of FIG. 1 illustrating the stages involved in raising and responding to an update event when a model element is updated in a modeling application.

FIG. 18 is a process flow diagram for one implementation of the system of FIG. 1 illustrating the stages involved in raising and responding to an update event when a model element is updated in a modeling application. In one form, the process of FIG. 18 is at least partially implemented in the operating logic of computing device 800 (of FIG. 20). The procedure begins at start point 630 with a custom model element is modified in the design surface of the modeling application and, at some later time, saved in the in memory store causing the event generator to receive a notification to issue the updated event (stage 632). An updated event action is issued by the event generator to the provider manager (stage 634). The provider manager forwards the updated event action to all registered custom providers that have been registered in the provider registry (number of registered custom providers from zero to unlimited) (stage 636). The custom provider makes calls to the read/write interface to gather model information (stage 638). The custom provider uses model information to update an artifact with gathered model information (stage 640). The process ends at end point 642.

Figure 19:
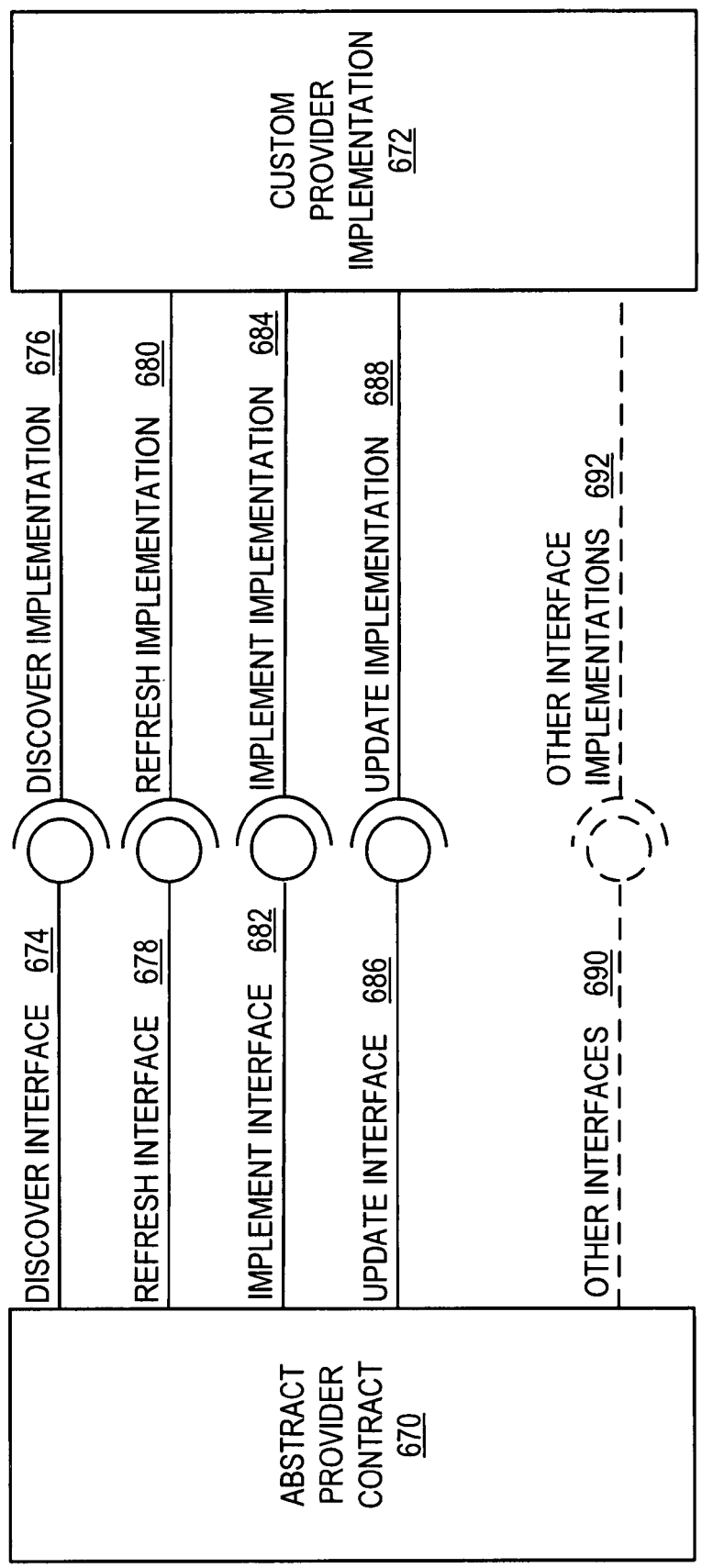
FIG. 19 is a diagrammatic view for one implementation of the system in FIG. 1 that illustrates the required interface elements that a custom provider must implement.

FIG. 19 is a diagrammatic view for one implementation of the system in FIG. 1 that illustrates the required interface elements that a custom provider must implement. Abstract provider contract 670 defines the set of methods, attributes, and events that a custom provider must implement in one implementation. In other implementations, some, all, and/or additional methods, attributes, and/or events can be provided. Methods that are included in Abstract provider contract 670 include discover interface 674, refresh interface 678, implement interface 682, and refresh interface 686. Optionally, other interfaces 690 may be implemented.

Custom provider implementation 672 contains programming logic that is specific to an instance of a custom provider that meets the requirements set forth by abstract provider contract 670. As illustrated by FIG. 19, custom provider implementation 672 has programming logic for discover implementation 676, refresh implementation 680, implement implementation 684, and update implementation 688. Optionally, custom provider implementation 672 may have programming logic that facilitates other interface implementations 692.

As shown in FIG. 20, an exemplary computer system to use for implementing one or more parts of the system includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 20 by dashed line 106.

Additionally, device 800 may also have additional features/functionality. For example, device 800 may also include additional storage (removable and/or non-removable) including, but not limited to, magnetic or optical disks or tape. Such additional storage is illustrated in FIG. 20 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Computing device 800 includes one or more communication connections 814 that allow computing device 800 to communicate with other computers/applications 815. Device 800 may also have input device(s) 812 such as keyboard, mouse, pen, voice input device, touch input device, etc. Output device(s) 811 such as a display, speakers, printer, etc. may also be included. These devices are well known in the art and need not be discussed at length here. In one implementation, computing device 800 includes modeling application 200 and/or artifact source application 230.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A system comprising at least one processing unit and at least one computer-readable storage medium storing instructions executable by the at least one processing unit to implement operations including:
   in response to an input, adding at least one new custom model element type to a modeling application;
   associating one or more custom behaviors with the at least one new custom model element type;
   in response to a triggering event, executing a particular one of the one or more custom behaviors;
   in response to creation of a custom model element representing an underlying artifact, automatically creating the underlying artifact;
   in response to revision of the custom model element, automatically updating the underlying artifact;
   in response to creation of a new artifact in an artifact source application, automatically creating a new model element representing the new artifact; and
   in response to revision of the new artifact, automatically updating the new model element representing the new artifact.

2. The system of claim 1, the operations further including:
   in response to at least one event requiring synchronization between at least one artifact and at least model element based on at least one change to the at least one artifact, forwarding the at least one event to at least one of a plurality of registered custom providers associated with a plurality of model element type plug-ins and registered in a provider registry; and
   via a read-write interface with the at least one of the registered custom providers, updating an in-memory store to cause the at least one model element to match the at least one artifact.

3. The system of claim 1, the operations further comprising responding to a toggle input by toggling between a view of a modeling application and a view of an artifact source application.

4. The system of claim 1, the operations further comprising using a calculated hash value to determine whether the custom model element has changed.

5. The system of claim 4, the operations further comprising buffering event calls associated with changes to the custom model element.

6. The system of claim 5, the operations further comprising combining multiple artifact updates associated with the buffered events into a single artifact update.

7. The system of claim 1, the operations further comprising calling a custom provider plug-in to automatically update the custom model element or the underlying artifact.

8. A method comprising using at least one computing device to perform operations including:
   generating events associated with model elements of a software model application and underlying artifacts that the model elements represent;
   forwarding the events to a provider manager configured to call one or more provider plug-ins to perform one or more associated actions; and
   synchronizing the model elements and the underlying artifacts in response to at least one of change detection or an aggregation of change events.

9. The method of claim 8, the synchronizing including determining whether at least one model element has changed.

10. The method of claim 8, the synchronizing including determining whether at least one artifact has changed.

11. The method of claim 9, the determining including using a calculated hash value.

12. The method of claim 10, the determining including using a calculated hash value.

13. The method of claim 8, further comprising buffering event calls associated with the aggregation of change events.

14. The method of claim 8, further comprising delaying the synchronizing based on a de-selection of a selected model element.

15. The method of claim 1, further comprising updating a registry of custom providers associated with a plurality of model element type plug-ins.

16. The method of claim 15, further comprising communicating with a custom provider via a read-write interface.

17. A computer-readable storage medium storing computer-executable instructions for causing a computing device to perform the method of claim 8.

18. A computer-readable storage medium storing computer-executable instructions, the instructions configured to, in response to execution:
   load custom model element types associated with a software modeling application;
   associate custom behavior with the custom model element types;
   interact with a provider manager configured to respond to events and invoke one or more registered providers corresponding to the custom model element types to respond the events;
   use a calculated hash value to determine whether at least one of a particular model in the modeling application or underlying one or more artifacts represented by the particular model has changed;
   based on the determining, aggregate multiple artifact updates for the particular model; and
   interact with an artifact mapper to automatically synchronize the particular model in the modeling application with the underlying one or more artifacts represented by the particular model, at least in part by combining the aggregated multiple artifact updates into a single artifact update.

19. The computer-readable storage medium of claim 18, the operations being further configured to store an association between the custom model element types, the custom behavior, and the events in a provider registry.

20. The computer-readable storage medium of claim 19, the operations being further configured to receive communications from the one or more registered providers.

* * * * *